US009132810B2

(12) United States Patent
Shioiri et al.

(10) Patent No.: US 9,132,810 B2
(45) Date of Patent: Sep. 15, 2015

(54) PARKING DEVICE

(75) Inventors: Hiroyuki Shioiri, Numazu (JP); Haruo Isomura, Susono (JP); Makoto Taniguchi, Susono (JP); Hiroyuki Shibata, Odawara (JP); Shotaro Kato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 13/393,425

(22) PCT Filed: Jun. 29, 2011

(86) PCT No.: PCT/JP2011/064955
§ 371 (c)(1),
(2), (4) Date: Feb. 29, 2012

(87) PCT Pub. No.: WO2013/001626
PCT Pub. Date: Jan. 3, 2013

(65) Prior Publication Data
US 2014/0284169 A1    Sep. 25, 2014

(51) Int. Cl.
*F16H 63/34* (2006.01)
*B60T 1/06* (2006.01)
(Continued)

(52) U.S. Cl.
CPC ... *B60T 1/12* (2013.01); *B60K 6/22* (2013.01); *B60K 6/26* (2013.01); *B60K 6/36* (2013.01); *B60K 6/40* (2013.01); *B60K 6/48* (2013.01); *B60T 1/005* (2013.01); *B60T 1/06* (2013.01); *B60T 1/062* (2013.01); *F16D 63/006* (2013.01); *F16D 65/12* (2013.01); *F16H 63/3441* (2013.01); *B60K 2006/4816* (2013.01);
(Continued)

(58) Field of Classification Search
CPC ....... B60T 1/12; B60T 1/062; F16H 63/3441; F16D 63/006
USPC .............. 192/219.4, 223.3; 74/411.5; 310/77; 188/31
See application file for complete search history.

(56) References Cited

U.S. PATENT DOCUMENTS 2,037,735 A * 4/1936 Oberhoffken ................. 188/171
3,068,975 A * 12/1962 Theuer ........................ 192/223.3
(Continued)

FOREIGN PATENT DOCUMENTS

JP    2001-355727    12/2001
JP    2007-187247    7/2007
(Continued)

OTHER PUBLICATIONS

International Search Report issued in International Application No. PCT/JP2011/064955 Dated Sep. 13, 2011 (with trans).

*Primary Examiner* — Terry Chau
(74) *Attorney, Agent, or Firm* — Oliff PLC

(57) ABSTRACT

A parking device includes a drive cam disposed around an MG shaft that transmits a drive force of a second motor generator by being coupled with a parking gear, a driven cam disposed around an MG shaft so as to be able to rotate integrally with the MG shaft and capable of moving in the axial direction of the MG shaft by a relative rotation generated between the driven cam and the drive cam when the parking gear is locked by a pilot clutch, and a dog type brake that engages the parking gear with the MG shaft and a transaxle case accommodating the parking device by the movement of the driven cam. With the configuration, a shock load at the time of operation can be suppressed and the parking device can be reduced in size.

19 Claims, 6 Drawing Sheets

(51) Int. Cl.
  *B60T 1/12*     (2006.01)
  *B60K 6/22*     (2007.10)
  *B60K 6/26*     (2007.10)
  *B60K 6/36*     (2007.10)
  *B60K 6/40*     (2007.10)
  *B60K 6/48*     (2007.10)
  *B60T 1/00*     (2006.01)
  *F16D 63/00*    (2006.01)
  *F16D 65/12*    (2006.01)
  *F16D 121/18*   (2012.01)

(52) U.S. Cl.
  CPC ......... *F16D2121/18* (2013.01); *Y02T 10/6221* (2013.01); *Y02T 10/6256* (2013.01)

(56) References Cited

U.S. PATENT DOCUMENTS

2001/0051556 A1    12/2001   Takenaka
2005/0236251 A1*   10/2005   Yamamoto ................ 192/219.4

FOREIGN PATENT DOCUMENTS

| JP | 2009-127843 | 6/2009 |
| JP | 2009-280147 | 12/2009 |
| JP | 2010-028979 | 2/2010 |
| JP | 2010-173414 | 8/2010 |
| JP | 2011-057011 | 3/2011 |

* cited by examiner

PARKING DEVICE

FIELD

The present invention relates to a parking device.

BACKGROUND

Conventionally, a parking device that is ordinarily used to a vehicle and the like is configured to include a parking gear coupled with any of rotating shafts from an engine input shaft to a drive shaft and a locking section such as a parking pole and the like and to shut off a power transmission to the drive shaft of a vehicle when the vehicle parks or stops by regulating the rotation of the parking gear by a locking section so that the forward/rearward travel of the vehicle can be prevented.

To operate the parking device, it is necessary to securely engage the parking gear with the locking section by appropriately rotating the parking gear. In the rotating operation of the parking gear, as a rotating shaft to which the parking gear is disposed becomes a shaft on a higher rotation side than the drive shaft, even if the vehicle moves in a slight amount, a sufficient operating amount can be obtained on the rotating shaft of the parking gear. For example, Patent Literature 1 discloses such a configuration that, in a hybrid vehicle having plural drive sources such as an engine and a motor, a parking device is disposed to a rotating shaft of the motor whose rotation becomes higher than a drive shaft.

Further, Patent Literature 2 describes a device for integrally rotating members by meshing the rotating members with each other by dog teeth, and the device has a cam capable of moving in a direction where the dog teeth are meshed in response to a rotation and a spring which urges in a direction opposite to the direction where the dog teeth are meshed with respect to the cam. Patent Literature 3 describes a configuration having a waiting mechanism of a spring in the peripheral direction of dog teeth. Patent Literature 4 describes a configuration in which a rotor member is extended in an axial direction to suppress a lubricant from entering into a space between a rotor and a stator.

CITATION LIST

Patent Literatures

Patent Literature 1: Japanese Patent Application Laid-open No. 2009-280147
Patent Literature 2: Japanese Patent Application Laid-open No. 2007-187247
Patent Literature 3: Japanese Patent Application Laid-open No. 2009-127843
Patent Literature 4: Japanese Patent Application Laid-open No. 2010-028979

SUMMARY

Technical Problem

However, in the conventional parking device described in Patent Literature 1, since the parking gear is connected to the rotating shaft, when the parking device is operated and the rotation of the rotating shaft is regulated, the parking device receives all the shock loads from the rotating shaft. Accordingly, it is necessary to increase the size of the parking device so that the parking device has high rigidity for withstanding the shock load.

An object of the present invention, which was made in view of the circumstances, is to provide a parking device which can suppress a shock load at the time of operation and can be made small in size.

Solution to Problem

In order to solve the above mentioned problem, a parking device according to the present invention for a hybrid vehicle configured to include an input shaft that transmits a drive force of an engine and a rotating electric machine shaft that transmits a drive force of a rotating electric machine separately and to transmit the drive force from the input shaft or the rotating electric machine shaft to a drive shaft, the parking device includes a parking gear; a locking section that locks the parking gear at the time of operation; a drive cam coupled with the parking gear and disposed around the rotating electric machine shaft; a driven cam disposed around the rotating electric machine shaft so as to be able to rotate integrally with the rotating electric machine shaft and capable of moving in an axial direction of the rotating electric machine shaft by a relative rotation generated between the driven cam and the drive cam when the parking gear is locked by the locking section; and an engaging section that engages the parking gear with the rotating electric machine shaft and a case accommodating the parking device by the movement of the driven cam.

Further, in the parking device, it is preferable to further include an urging member that urges in a direction opposite to a moving direction of the driven cam by a movement of at least the driven cam.

Further, in the parking device, it is preferable that at least parts of the drive cam, the driven cam, and the engaging section are disposed inside of a rotor of the rotating electric machine in a radial direction.

Further, in the parking device, it is preferable to further include a coupling member that couples the drive cam with the parking gear and extends from inside of the rotor in the radial direction to outside of the rotor in the axial direction.

Further, in the parking device, it is preferable that a plurality of projections are disposed outside of the coupling member in the radial direction.

Further, in the parking device, it is preferable that the engaging section is a dog type brake, and a waiting mechanism in the axial direction is preferably disposed between the driven cam and the dog type brake.

Further, in the parking device, it is preferable that a waiting mechanism in the peripheral direction is disposed to the dog type brake.

Further, in the parking device, it is preferable that the engaging section is a dog type brake, and an elastic member is preferably integrally disposed between the driven cam and the dog type brake in the radial direction and the axial direction.

Advantageous Effects of Invention

In the parking device according to the present invention, when the parking gear is locked by the locking section, that is, when the parking device operates, the driven can moves in the axis direction of the rotating electric machine shaft, the engaging section is operated by the movement of the driven cam, and the parking gear is engaged with the rotating electric machine shaft and the case. At the time, since the parking gear and the case are fixed, the rotation of the rotating electric machine shaft engaged with them is regulated, and although a reaction force is generated thereby, the reaction force is transmitted from the rotating electric machine shaft to both the parking gear and the case while being dispersed. Accordingly, when the parking device is operated, the reaction force transmitted from the rotating electric machine shaft to the parking gear and the locking section can be reduced. As the result, the parking device according to the present invention can achieve an effect capable of suppressing the shock load at the time of operation and reducing a size.

DESCRIPTION OF EMBODIMENTS

Embodiments of a parking device according to the present invention will be explained below based on the drawings. Note that, in the following drawings, the same or corresponding sections are denoted by the same reference signs and an explanation of the sections is not repeated.

First Embodiment

A first embodiment of the present invention will be explained referring to FIGS. 1 to 5.

Figure 1:
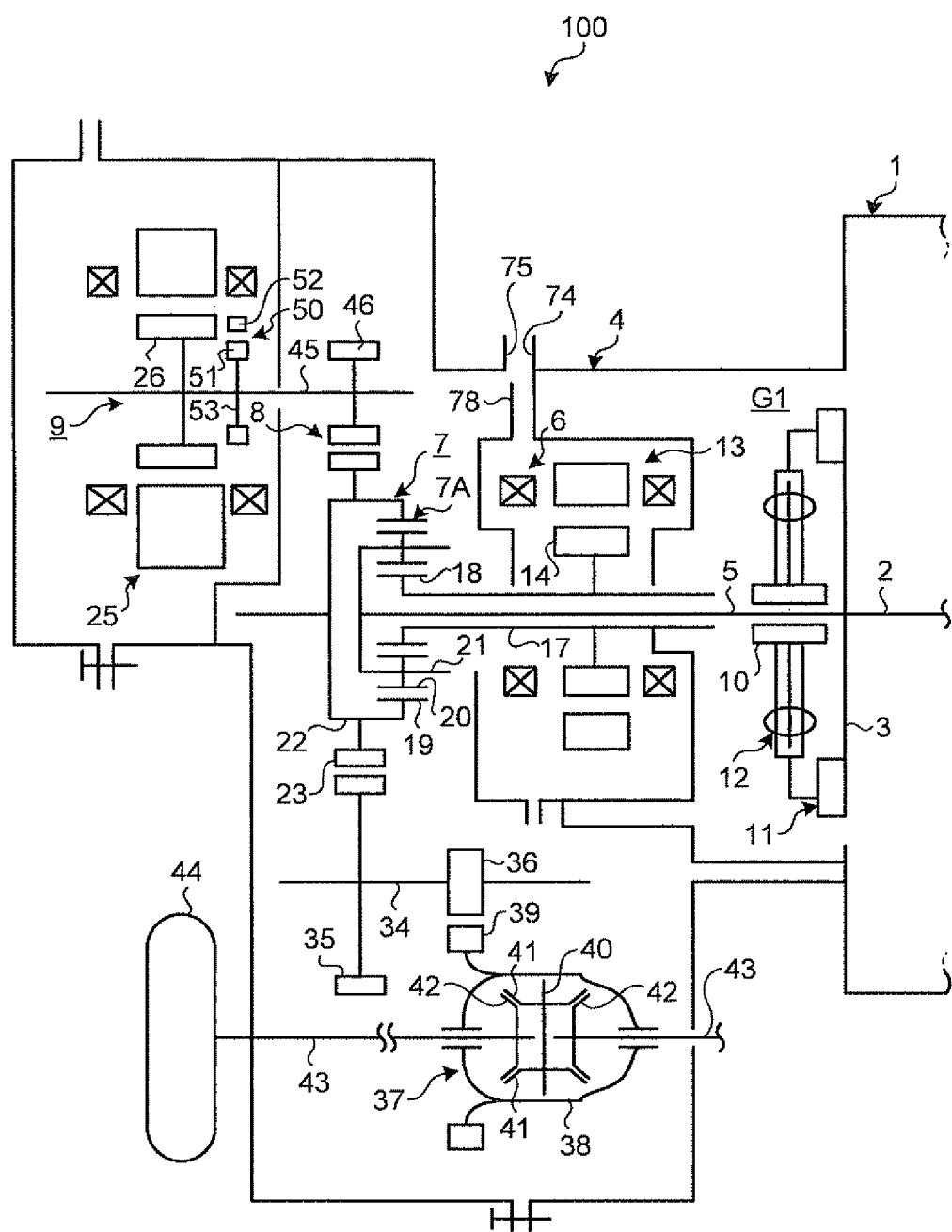
FIG. 1 is a skeleton view illustrating a power transmission device of a hybrid vehicle to which a parking device according to an embodiment of the present invention is applied.

First, a configuration of a power transmission device of a hybrid vehicle to which a parking device according to an embodiment of the present invention is applied will be explained referring to FIG. 1. FIG. 1 is a skeleton view illustrating a power transmission device 100 of the hybrid vehicle to which a parking device 50 according to the embodiment of the present invention is applied.

The power transmission device 100 of the hybrid vehicle uses an engine 1 as a main power source.

The engine 1 is an apparatus for outputting a power from a crank shaft 2 by combusting a fuel and is a known apparatus having an intake device, an exhaust device, a fuel injection device, an ignition device, a cooling device and the like. As the engine 1, although an internal combustion engine, specifically, a gasoline engine or a diesel engine or an LPG engine or a methanol engine or a hydrogen engine, and the like can be used, in the embodiment, a case using a gasoline engine as the engine 1 will be explained for the purpose of convenience.

The crank shaft 2 extending from the engine 1 is disposed in a width direction of the vehicle as well as horizontally, and a flywheel 3 is formed to a rear end of the crank shaft 2. Further, a hollow transaxle case 4 is attached to an outside wall of the engine 1.

An input shaft 5, a first motor generator 6, a power synthesizing mechanism 7, a transmission mechanism 8, a second motor generator (rotating electric machine) 9 are disposed to an inside G1 of the transaxle case 4. The input shaft 5 is disposed concentrically with the crank shaft 2. A clutch hub 10 is spline engaged with the end of the input shaft 5 on the crank shaft 2 side.

A clutch 11 for controlling the power transmission state of the flywheel 3 and the input shaft 5 are disposed in the transaxle case 4. Further, a damper mechanism 12 for suppressing and absorbing the torque variation between the flywheel 3 and the input shaft 5 is disposed. The first motor generator 6 is disposed outside of the input shaft 5, and the second motor generator 9 is disposed at a position farther from the engine 1 than the first motor generator 6.

That is, the first motor generator 6 is disposed between the engine 1 and the second motor generator 9. The first motor generator 6 and the second motor generator 9 have both a function as a motor driven by being supplied with power (powering function) and a function as a generator for transforming kinetic energy to electric energy (regenerating function). As the first motor generator 6 and the second motor generator 9, for example, an alternating current synchronous motor generator can be used. As a power supply device for supplying power to the first motor generator 6 and the second motor generator 9, a power storage device such as a battery, a capacitor, and the like or a known fuel battery and the like can be used.

A hollow shaft 17 is concentrically attached to an outer periphery of the input shaft 5. Then, the input shaft 5 and the hollow shaft 17 are relatively rotatably configured. The first motor generator 6 has a stator 13 fixed to the transaxle case 4 side and a rotor 14 free to rotate, and the rotor 14 of the first motor generator 6 is coupled with an outer peripheral side of the hollow shaft 17.

Further, the power synthesizing mechanism (in other words, power distribution mechanism) 7 is disposed between the first motor generator 6 and the second motor generator 9. The power synthesizing mechanism 7 has a so-called single pinion type planetary gear mechanism 7A. That is, the planetary gear mechanism 7A has a sun gear 18, a ring gear 19 concentrically disposed with the sun gear 18, and a carrier 21 for holding a pinion gear 20 engaged with the sun gear 18 and the ring gear 19. Then, the sun gear 18 is coupled with the hollow shaft 17, and the carrier 21 is coupled with the input shaft 5. Note that the ring gear 19 is formed to an inner periphery side of an annular member (in other words, cylindrical member) 22 concentrically disposed with the input shaft 5, and a counter drive gear 23 is formed to an outer peripheral side of the annular member 22.

The second motor generator 9 is disposed at a position farther from the engine 1 than the counter drive gear 23. The second motor generator 9 has a stator 25 fixed to the transaxle case 4 and a rotor 26 free to rotate, and the rotor 26 of the second motor generator 9 is coupled with an outer periphery of an MG shaft (rotating electric machine shaft) 45.

The MG shaft 45 is disposed in the width direction of the vehicle approximately horizontally. The MG shaft 45 and the input shaft 5 and the hollow shaft 17 are non-concentrically disposed. In other words, the position of a center axis line of the MG shaft 45 is different from the position of a center axis line of the input shaft 5. In further other words, the MG shaft 45 and the input shaft 5 and the hollow shaft 17 are offset in the radial directions thereof.

A gear 46 is formed to (is coupled with) the end of the MG shaft 45 on the power synthesizing mechanism 7 side. The gear 46 is meshed with the counter drive gear 23. The counter drive gear 23 and the gear 46 are configured such that a transmission gear ratio when power is transmitted from the gear 46 to the counter drive gear 23 becomes larger than "1". The transmission mechanism 8 is configured by the gear 46 and the counter drive gear 23. When the power of the second motor generator 9 is transmitted to the gear 46 via the MG shaft 45, the rotation speed of the gear 46 is reduced and transmitted to the annular member 22. That is, the torque of the second motor generator 9 is amplified and transmitted to the power synthesizing mechanism 7.

In contrast, a counter shaft 34 which is parallel with the input shaft 5 is disposed inside of the transaxle case 4. The counter shaft 34 is formed with a counter driven gear 35 and a final drive pinion gear 36. Then, the counter drive gear 23 is engaged with the counter driven gear 35. Further, a differential 37 is disposed inside of the transaxle case 4, and the differential 37 has a final ring gear 39 formed to an outer peripheral side of a differential case 38, plural pinion gears 41 attached to and coupled with the differential case 38 via a pinion shaft 40, side gears 42 engaged with the plural pinion gears 41, and two front drive shafts 43 coupled with the side gears 42. The respective front drive shafts 43 are coupled with wheels 44. As described above, a so-called transaxle is configured in which the transmission mechanism 8 and the differential 37 are collectively assembled in the transaxle case 4.

In the hybrid vehicle configured as described above, the required torque to be transmitted to the wheels 44 is calculated based on conditions such as a vehicle speed, an accelerator opening degree, and the like, and the engine 1, the clutch 11, the first motor generator 6, and the second motor generator 9 are controlled based on the result of calculation. When the torque output from the engine 1 is transmitted to the wheels, the clutch 11 is engaged. Thus, the power of the crank shaft 2 (in other words, torque) is transmitted to the carrier 21 via the input shaft 5.

The torque transmitted to the carrier 21 is transmitted to the wheels 44 via the ring gear 19, the annular member 22, the counter drive gear 23, the counter driven gear 35, the counter shaft 34, the final drive pinion gear 36, and the differential 37, and drive force is generated. Further, when the torque of the engine 1 is transmitted to the carrier 21, the first motor generator 6 can be functioned as the generator and generated power can be charged to a power storage device (not illustrated).

Further, the second motor generator 9 can be driven as the motor and the power thereof can be transmitted to the power synthesizing mechanism 7 (can be functioned as a drive source). When the power of the second motor generator 9 is transmitted to the gear 46 via the MG shaft 45, the rotation speed of the gear 46 is reduced and transmitted to the annular member 22. That is, the torque of the second motor generator 9 is amplified and transmitted to the power synthesizing mechanism 7. As described above, the power of the engine 1 and the power of the second motor generator 9 are input to and synthesized by the power synthesizing mechanism 7, and the synthesized power is transmitted to the wheels 44. That is, the power synthesizing mechanism 7 transmits at least any one of the power of the engine 1 and the power of the second motor generator 9 to the wheels 44.

In the embodiment, a parking device 50 for cutting off the transmission of power to the drive shaft of the vehicle when the vehicle parks or stops and prevents the vehicle from traveling forward and rearward is disposed to the MG shaft 45 in the power transmission device 100 of the hybrid vehicle as described above. In particular, the parking device 50 according to the embodiment is configured including a parking gear 51 and a pilot clutch (locking section) 52 for regulating the parking gear 51 and further including a parking mechanism 53 for coupling the parking gear 51 to the MG shaft 45 as its rotating shaft.

Figure 2:
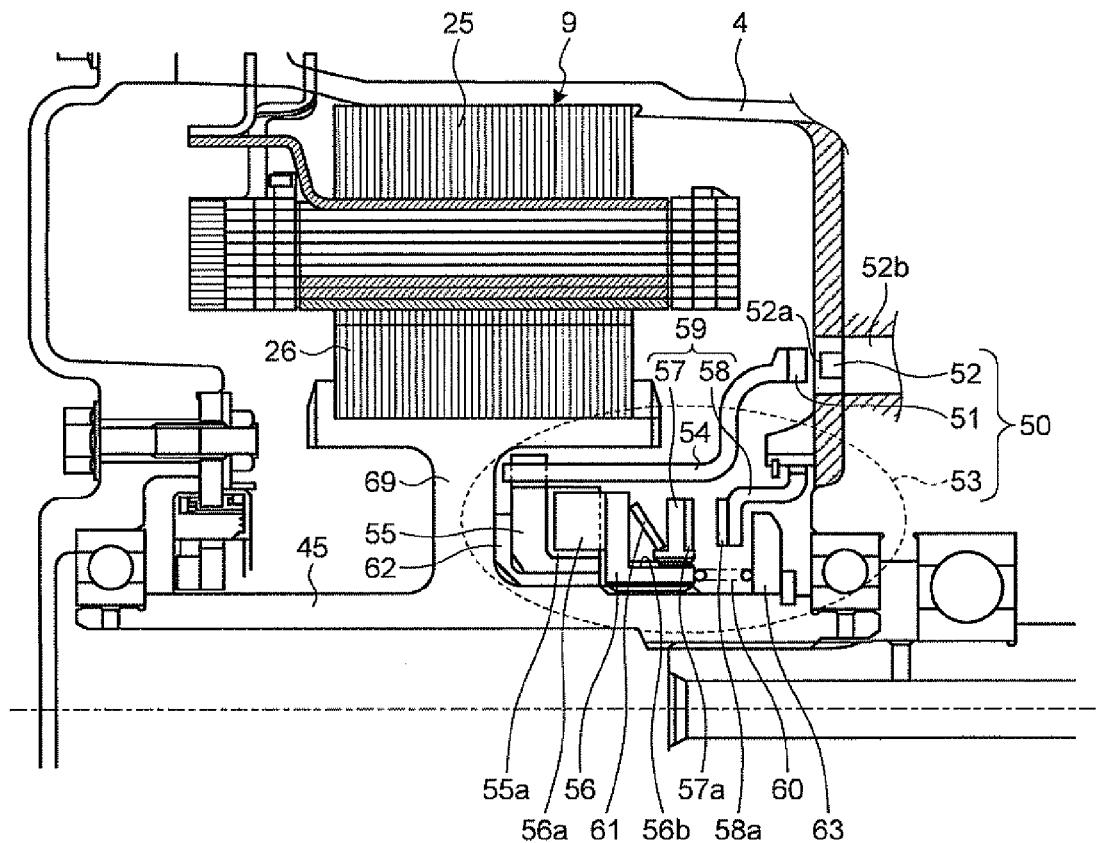
FIG. 2 is a view illustrating a schematic configuration in the vicinity of an MG shaft 45 including a parking device according to a first embodiment.

Next, the parking device 50 according to the embodiment will be explained in detail referring to FIGS. 2 to 4. FIG. 2 is a view illustrating a schematic configuration in the vicinity of the MG shaft 45 including the parking device 50, FIG. 3 is a view mainly illustrating an engaging section where the parking gear 51 is engaged with the pilot clutch 52 of the parking device 50 illustrated in FIG. 2 when viewed from above FIG. 2, and FIG. 4 is a perspective view illustrating a configuration of a second member 58 of a dog type brake 59 illustrated in FIG. 2.

Figure 3:
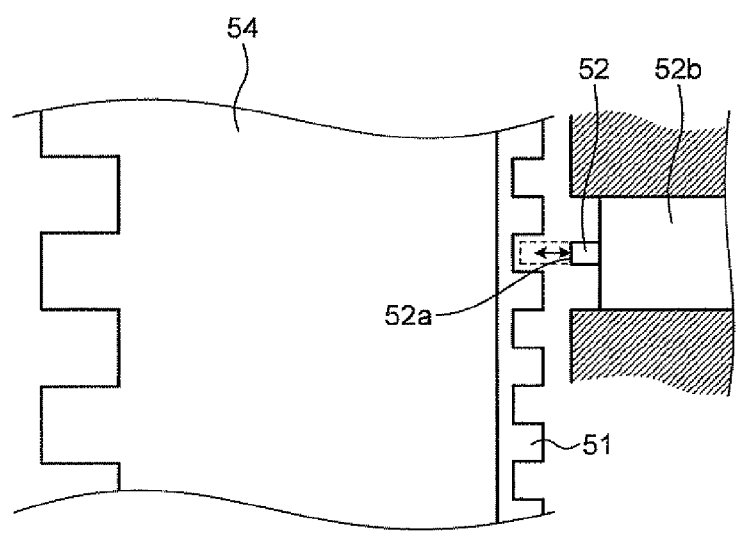
FIG. 3 is a view mainly illustrating an engaging section where a parking gear is engaged with a pilot clutch in the parking device illustrated in FIG. 2 when viewed from above FIG. 2.
Figure 4:
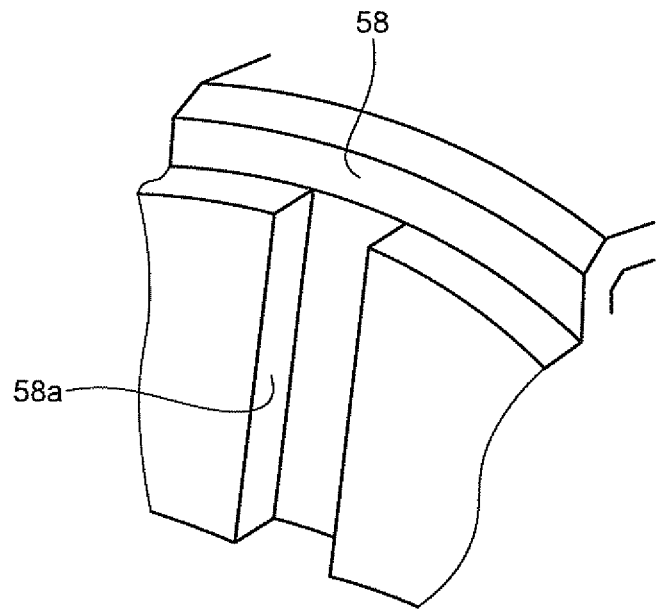
FIG. 4 is a perspective view illustrating a configuration of a second member of a dog type brake illustrated in FIG. 2.

As illustrated in FIGS. 2, 3, the parking gear 51 is composed of plural dog teeth disposed about the axial center of the MG shaft 45 in a peripheral direction and the dog teeth are disposed so as to face an axial direction, respectively (in FIGS. 2, 3, in a right direction). In a state that the parking gear 51 is not regulated by the pilot clutch 52, when the MG shaft 45 is rotated by the drive force of the second motor generator 9 or by the reaction force received from the drive shaft side by that the wheels 44 are rotated by a vehicle weight on a slope road and the like, the parking gear 51 is rotated in association with the MG shaft 45.

The pilot clutch 52 is a rod-like member capable of reciprocating in the axial direction of the MG shaft 45 and disposed so that an extreme end 52a thereof confronts with the parking gear 51. In an example illustrated in FIG. 2, the pilot clutch 52 is fixedly disposed inside of the transaxle case 4 on the right side of the parking gear 51.

At an ordinary time, the pilot clutch 52 is configured so as to be located at a position (solid line of FIG. 3) where the extreme end 52a is not in contact with the dog teeth of the parking gear 51 and so as not to be engaged with the parking gear 51. In contrast, since the pilot clutch 52 is configured such that, at the time of operation (for example, a shift position of the vehicle is located at a parking position), the extreme end 52a moves (extends) to the parking gear 51 side (left side in FIGS. 2, 3), inserted among the dog teeth of the parking gear 51 (broken line of FIG. 3) and thus the rotation of the parking gear 51 can be regulated by locking the parking gear 51.

As illustrated in, for example, FIGS. 2, 3, the pilot clutch 52 may be configured so as to be driven by an actuator 52b (specifically, a linear solenoid, a motor-driven type screw structure, and the like) or may be configured so as to be manually driven in association with a gear operation of a driver likewise a conventional parking pole. Further, it is sufficient that the pilot clutch 52 can regulate the rotation of the parking gear 51, and the positional relation of the parking gear 51 and the pilot clutch 52 may be other than the axial direction illustrated in FIGS. 2, 3.

The parking mechanism 53 is an aggregated body of members for coupling the parking gear 51 with the MG shaft 45 and is configured specifically including, as illustrated in FIG. 2, a tube (coupling member) 54 having the parking gear 51 disposed to one end thereof, a drive cam 55 coupled with the parking gear 51 via the tube 54, a driven cam 56 disposed in confrontation with the drive cam 55, the dog type brake (engaging section) 59 for engaging the parking gear 51 with the MG shaft 45 and the transaxle case 4 by the movement of the driven cam 56, and a return spring (urging member) 60 for urging in a direction opposite to the moving direction of the driven cam 56 by the movement of the driven cam 56.

The tube 54 is a cylindrical member disposed around the MG shaft 45 and is coupled with the drive cam 55 at the other end on a side opposite to one end where the parking gear 51 is disposed in the axial direction. Further, the tube 54 is disposed so as to cover the respective elements of the parking mechanism 53 from outside of the MG shaft 45 in the radial direction. In other words, the tube 54 is disposed between the MG shaft 45 and the parking mechanism 53, and the second motor generator 9.

The drive cam 55 is disposed around the periphery of the MG shaft 45 in a ring-shape. A surface of the drive cam 55 in the axial direction (left side in FIG. 2) is abutted to a regulation member 62 and the movement of the drive cam 55 in the axial direction is regulated by the regulation member 62. Further, the surface of the drive cam 55 opposite to the surface abutted to the regulation member 62 (right side in FIG. 2) is disposed with a cam surface 55a along a peripheral direction.

The driven cam 56 is disposed around the periphery of the MG shaft 45 in a ring-shape likewise the drive cam 55. The driven cam 56 also has a cam surface 56a along the peripheral direction on a surface in the axial direction (left side in FIG. 2) likewise the drive cam 55, and the cam surface 56a is disposed so as to confront with the cam surface 55a of the drive cam 55 and to be abutted thereto. That is, the drive cam 55 and the driven cam 56 configure a thrust cam mechanism in which the distance therebetween is changed depending on a position at which the cam surfaces 55a, 56a are abutted to each other.

Further, the driven cam 56 is spline engaged on the outer peripheral surface of the MG shaft 45 and can be rotated integrally with the MG shaft 45 with its movement in the peripheral direction regulated as well as can slide in the axial direction.

The dog type brake 59 is configured including a first member 57 having plural dog teeth 57a and a second member 58 having groove sections 58a and, as illustrated in FIG. 2, is disposed so that a surface of the first member 57 having the dog teeth 57a confronts with a surface of the second member 58 having the groove sections 58a and all the dog teeth 57a are disposed so that they can be engaged with the groove sections 58a at the same time.

The first member 57 of the dog type brake 59 is a ring-shaped member and coupled with the driven cam 56. More specifically, as illustrated in FIG. 2, the first member 57 is spline engaged on a peripheral surface 56b disposed to a side of the driven cam 56 opposite to the cam surface 56a of the driven cam 56 in the axial direction (right side in FIG. 2). With the configuration, the first member 57 can be rotated integrally with the driven cam 56 (and the MG shaft 45) with its movement in the peripheral direction regulated as well as can slide on the peripheral surface 56b of the driven cam 56 in the axial direction.

Further, the first member 57 has the plural dog teeth 57a on a surface confronting with the second member 58 in the axial direction so that the plural dog teeth 57a are engaged with the second member 58. Each of the dog teeth 57a is formed in a shape which projects, for example, along the radial direction in a predetermined width (refer to FIGS. 6, 7).

A coned disc spring 61 is disposed in a space between the first member 57 and the driven cam 56 in the axial direction. The coned disc spring 61 functions as a waiting mechanism in the axial direction when the dog teeth 57a of the first member 57 are engaged with the groove sections 58a of the second member 58. More specifically, when the phase of the dog teeth 57a does not agree with the phase of the groove sections 58a, the coned disc spring 61 is flexed by a reaction force, which is received from the second member 58 by the first member 57, and absorbs the reaction force, and when the phase of the dog teeth 57a agrees with the phase of the groove sections 58a, the first member 57 is pushed out by the urging force of the coned disc spring 61 and can be engaged with the second member 58. Further, as the driven cam 56 moves in the axial direction, since the coned disc spring 61 receives a press force from the driven cam 56 and transmits the press force to the first member 57, the first member 57 can also move in the same direction in association with the driven cam 56.

As illustrated in FIG. 2, the second member 58 of the dog type brake 59 is couple with and fixed to the transaxle case 4, the extreme end of the second member 58 forms a surface confronting with the first member 57, and, as illustrated in FIG. 4, the plural groove sections 58a are disposed on the surface. The disposition of the groove sections 58a is caused to correspond to the disposition of the dog teeth 57a of the first member 57.

When the dog type brake 59 operates, the dog teeth 57a of the first member 57 are engaged with the groove sections 58a of the second member 58, and the movement of the dog teeth 57a in the peripheral direction due to the rotation of the first member 57 is locked by the groove sections 58a of the second member 58 fixed to the transaxle case 4.

A stopper flange 63 is fixedly disposed on the outer peripheral surface of the MG shaft 45 on a side opposite to the drive cam 55 in the axial direction (right side in FIG. 2) about the driven cam 56. The return spring (urging member) 60 is coupled between the stopper flange 63 and the driven cam 56. Since the stopper flange 63 is fixed to the MG shaft 45 and further the driven cam 56 can slide in the axial direction, as the driven cam 56 moves to the stopper flange 63 side and the distance therebetween becomes shorter, the return spring 60 is more contracted and an urging force generated in a direction opposite to the moving direction of the driven cam 56 also increases.

Further, in the embodiment, as illustrated in FIG. 2, the rotor 26 of the second motor generator 9 is coupled with an outer peripheral end of a disc-shaped support section 69 extending from the outer peripheral surface of the MG shaft 45 to the outside in the radial direction. In other words, the rotor 26 is disposed away from the outer peripheral surface of the MG shaft 45 to the outside in the radial direction. The width of the support section 69 in the axial direction is formed smaller than the width of the rotor 26. With the configuration, a space is formed inside of the rotor 26 in the radial direction, and at least a part of the parking mechanism 53 is accommodated in the space and disposed inside of the rotor 26 of the second motor generator 9 in the radial direction. In an example illustrated in FIG. 2, a part of the tube 54 (a portion on a side where the tube 54 is coupled with the drive cam 55), the drive cam 55, the driven cam 56, the coned disc spring 61, and a part of the first member 57 of the dog type brake 59 are disposed inside of the rotor 26 of the second motor generator 9 in the radial direction.

Next, an operation of the parking device 50 according to the embodiment will be explained referring to FIGS. 2, 5.

Figure 5:
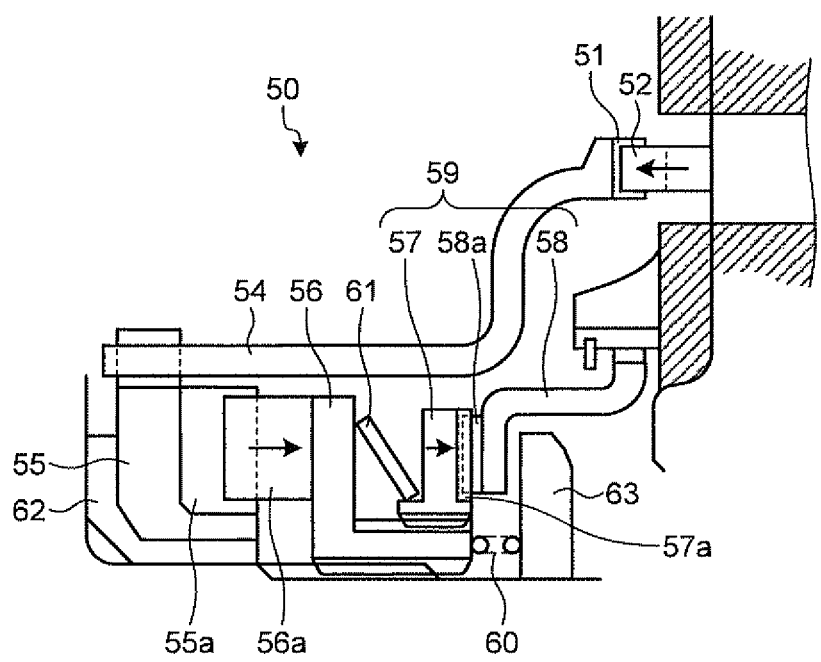
FIG. 5 is a view illustrating the positional relation of respective sections of the parking device according to the first embodiment when the parking device operates.

FIG. 5 is a view illustrating the positional relation of respective sections of the parking device 50 when the parking device 50 operates.

When the parking device 50 does not operate, the pilot clutch 52 is not engaged with the parking gear 51 as illustrated in FIG. 2. At the time, when the MG shaft 45 is rotated by being driven by the second motor generator 9 and the vehicle weight and the like, the driven cam 56 which is spline engaged with the MG shaft 45 is rotated integrally with the MG shaft 45. The drive cam 55 is also rotated by the rotation of the driven cam 56 in association with the MG shaft 45 and the driven cam 56 via the cam surface 55a abutted to the cam surface 56a of the driven cam 56. Then, the tube 54 coupled with the drive cam 55 and the parking gear 51 disposed to an end of the tube 54 are also rotated integrally by the rotation of the drive cam 55.

When the parking device 50 operates, the pilot clutch 52 is engaged with the parking gear 51 and the rotation of the parking gear 51 is regulated as illustrated in FIG. 5. Accordingly, the rotations of the tube 54 disposed with the parking gear 51 and the drive cam 55 coupled with the tube 54 are also regulated. At the time, since the driven cam 56 which is spline engaged with the MG shaft 45 is rotated integrally with the MG shaft 45 as described above, a relative rotation is generated between the drive cam 55 and the driven cam 56.

The cam surface 55a of the drive cam 55 and the cam surface 56a of the driven cam 56 are pressed to each other by the relative rotation. Here, since the movement of the drive cam 55 in the axial direction is regulated by the regulation member 62, the driven cam 56 receives a reaction force from the cam surface 55a of the drive cam 55. Since the driven cam 56 is spline engaged with the MG shaft 45 and can slide on the outer peripheral surface of the MG shaft 45 in the axial direction, the driven cam 56 moves in a direction where it is away from the drive cam 55 (in the figure, a right direction) using the reaction force as a thrust force in the axial direction.

The first member 57 of the dog type brake 59 approaches to the second member 58 by receiving a thrust force moving in the same direction as the driven cam 56 via the coned disc spring 61 by the movement of the driven cam 56, and further the return spring 60 disposed between the driven cam 56 and the stopper flange 63 is contracted.

Then, as illustrated in FIG. 5, when the dog teeth 57a of the first member 57 are engaged with the groove sections 58a of the second member 58 of the dog type brake 59 by the movement of the first member 57 of the dog type brake 59 in the axial direction, the first member 57 is locked by the second member 58 which is coupled with and fixed to the transaxle case 4, and the rotation of the driven cam 56 which is spline engaged with the first member 57 is regulated with a result that the rotation of the MG shaft 45 which is spline engaged with the driven cam 56 is also regulated.

At the time, since the MG shaft 45 is coupled with the transaxle case 4 via the dog type brake 59 as well as coupled with the parking gear 51 and the pilot clutch 52 via the driven cam 56, the drive cam 55, and the tube 54, the reaction force, which is generated by that the rotation of the MG shaft 45 is regulated, is transmitted while being dispersed to the transaxle case 4, the parking gear 51, and the pilot clutch 52.

Next, an operation/working-effect of the parking device 50 according to the embodiment will be explained.

In the parking device 50 of the embodiment, the drive cam 55 is coupled with the parking gear 51 and disposed around the MG shaft 45, and the driven cam 56 is disposed around the MG shaft 45 so as to be able to rotate integrally with the MG shaft 45. The driven cam 56 can move in the axial direction of the MG shaft 45 by the relative rotation generated between the driven cam 56 and the drive cam 55 when the parking gear 51 is locked by the pilot clutch 52. Further, the dog type brake 59 causes the parking gear 51 to be engaged with the MG shaft 45 and the transaxle case 4 for accommodating the parking device 50 by the movement of the driven cam 56.

With the configuration, when the parking gear 51 is locked by the pilot clutch 52, that is, when the parking device 50 operates, the driven cam 56 moves in the axial direction of the MG shaft 45, the dog type brake 59 operates due to the movement of the driven cam 56, and the parking gear 51 is engaged with the MG shaft 45 and the transaxle case 4. At the time, since the parking gear 51 and the transaxle case 4 are fixed, the rotation of the MG shaft 45 engaged with them are regulated and the reaction force is generated thereby. However, the reaction force is transmitted from the MG shaft 45 while being dispersed to both the parking gear 51 and the transaxle case 4. Accordingly, when the parking device 50 is operated, the reaction force transmitted from the MG shaft 45 to the parking gear 51 and the pilot clutch 52 can be reduced with a result that a shock load at the time of operation can be suppressed and thus the parking device 50 can be reduced in size. Further, since the shock load received from the parking gear 51 and the pilot clutch 52 can be suppressed, durability can be improved.

Further, in the parking device 50 of the embodiment, the return spring 60 is urged in a direction opposite to the moving direction of the driven cam 56 by the movement of at least the driven cam 56. With the configuration, when the parking device 50 operates, a part of motion energy due to the movement of the driven cam 56 in the axial direction can be accumulated in the return spring 60. With the operation, a shock when the dog type brake 59 operates can be reduced by reducing motion energy and a shock load generated when the MG shaft 45 is coupled with the parking gear 51 and the transaxle case 4 can be suppressed. As the result, the durability of the respective parts of the parking device 50 such as the dog type brake 59, the parking gear 51 and the pilot clutch 52 can be more improved. Further, a shock when the vehicle stops can be reduced.

Further, in the parking device 50 of the embodiment, at least parts of the drive cam 55, the driven cam 56, and the dog type brake 59 are disposed inside of the rotor 26 of the second motor generator 9 in the radial direction. With the configuration, since the second motor generator 9 and a part of the parking device 50 can be disposed around the MG shaft 45 while being overlapped, an increase of physical size of the transaxle (transaxle case 4) can be suppressed.

Further, in the parking device 50 of the embodiment, the tube 54 extends from inside of the rotor 26 in the radial direction to outside of the rotor 26 in the axial direction and couples the drive cam 55 with the parking gear 51. With the configuration, since the tube 54 is disposed between the MG shaft 45 and the second motor generator 9, oil leaked from an axial center side can be shielded by the tube 54. With the operation, since the oil leaked from the axial center side can be suppressed from entering to a space between the rotor 26 and the stator 25 of the second motor generator 9 in the radial direction, a torque loss which is caused due to stirring when the oil enters can be reduced. Further, when the shape of the tube 54 is adjusted, since the positional relation between the parking gear 51 and the pilot clutch 52, and the parking mechanism 53 can be optionally changed, the degree of freedom of disposition of the parking gear 51 and the pilot clutch 52 in the transaxle is improved.

Further, in the parking device 50 of the embodiment, the coned disc spring 61 is disposed between the driven cam 56 and the dog type brake 59. With the configuration, even if a phase difference exists between the dog teeth 57a and the groove sections 58a when the dog type brake 59 operates by the movement of the driven cam 56, since the coned disc spring 61 functions as the waiting mechanism in the axial direction by accumulating a contact force until the phases of both the dog teeth 57a and the groove sections 58a agree with each other, the dog type brake 59 can be smoothly operated.

Modifications of First Embodiment

Figure 6:
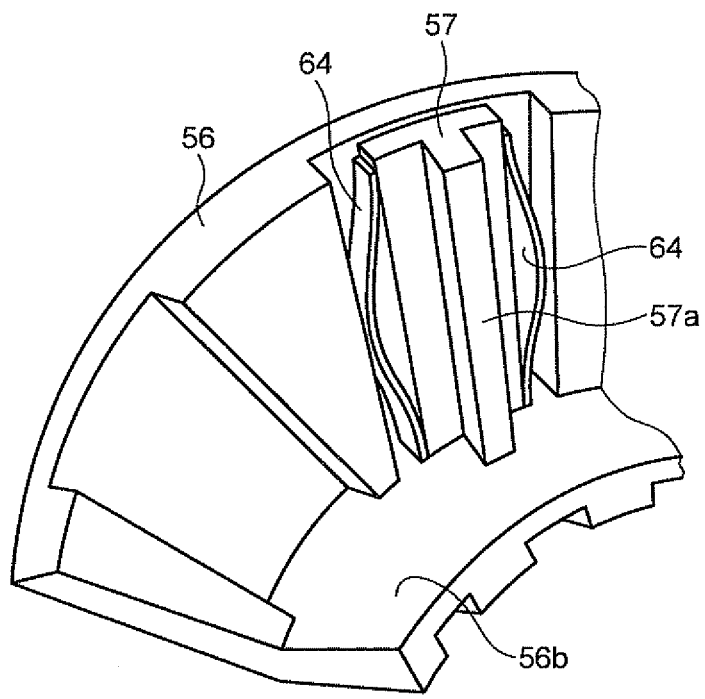
FIG. 6 is a perspective view illustrating a configuration of a first member of a dog type brake in a first modification of the first embodiment.
Figure 7:
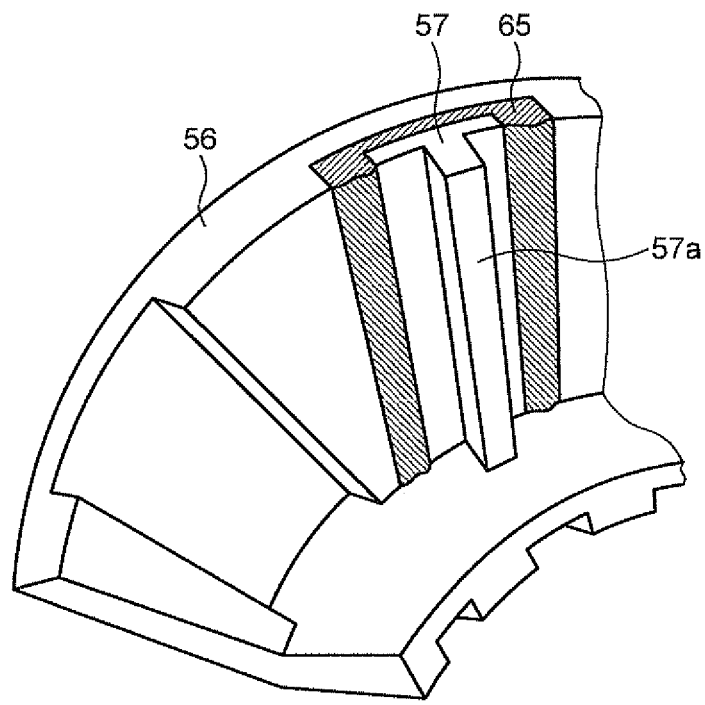
FIG. 7 is a perspective view illustrating a configuration of a first member of a dog type brake in a second modification of the first embodiment.

Next, modifications of the embodiment will be explained referring to FIG. 6, 7. FIG. 6 is a perspective view illustrating a configuration of a first member 57 of a dog type brake 59 in a first modification of the embodiment, and FIG. 7 is a perspective view illustrating a configuration of a first member 57 of a dog type brake 59 in a second modification of the embodiment.

In the embodiment described above, although the coned disc spring 61 functions as the waiting mechanism in the axial direction of the dog type brake 59, sheet springs 64 can be further disposed to both the sides in the peripheral direction of each of the dog teeth 57a of the first member 57 of the dog type brake 59 as illustrated in FIG. 6. The sheet springs 64 function as a waiting mechanism in the peripheral direction for absorbing a shock in the peripheral direction received by the dog teeth 57a at the time of engagement with the second member 58.

When the sheet springs 64 are applied as the waiting mechanism in the peripheral direction, the first member 57 of the dog type brake 59 is individually divided to the respective ones of plural dog teeth 57a as illustrated in FIG. 6, and the respective first members 57 are configured so that they can move on the peripheral surface 56b of the driven cam 56 in the peripheral direction.

With the configuration, when the dog type brake 59 operates, since the sheet springs 64 absorb the shock in the peripheral direction received by the dog teeth 57a in contact with the groove sections 58a and can push the dog teeth 57a to the back of the groove sections 58a while relatively rotating the dog teeth 57a in the peripheral direction with respect to the groove sections 58a, the dog teeth 57a can be securely engaged with the groove sections 58a. Further, since the surface pressure between the dog teeth 57a and the groove sections 58a can be reduced, the strength of the dog type brake 59 can be improved.

Further, in the first modification, although the coned disc spring 61 is exemplified as the waiting mechanism in the axial direction of the dog type brake 59 and the sheet springs 64 are exemplified as the waiting mechanism in the peripheral direction, they may be replaced with other means when they can function as the waiting mechanisms. For example, as illustrated in FIG. 7, elastic members 65 may be integrally disposed between the driven cam 56 and the respective dog teeth 57a of the first member 57 of the dog type brake 59 in the radial direction and in the axial direction. The elastic members 65 integrally couple the driven cam 56 with the respective dog teeth 57a of the first member 57 of the dog type brake 59 by vulcanization bonding and the like. With the configuration, the waiting mechanism can be easily formed and cost can be reduced.

Second Embodiment

Figure 8:
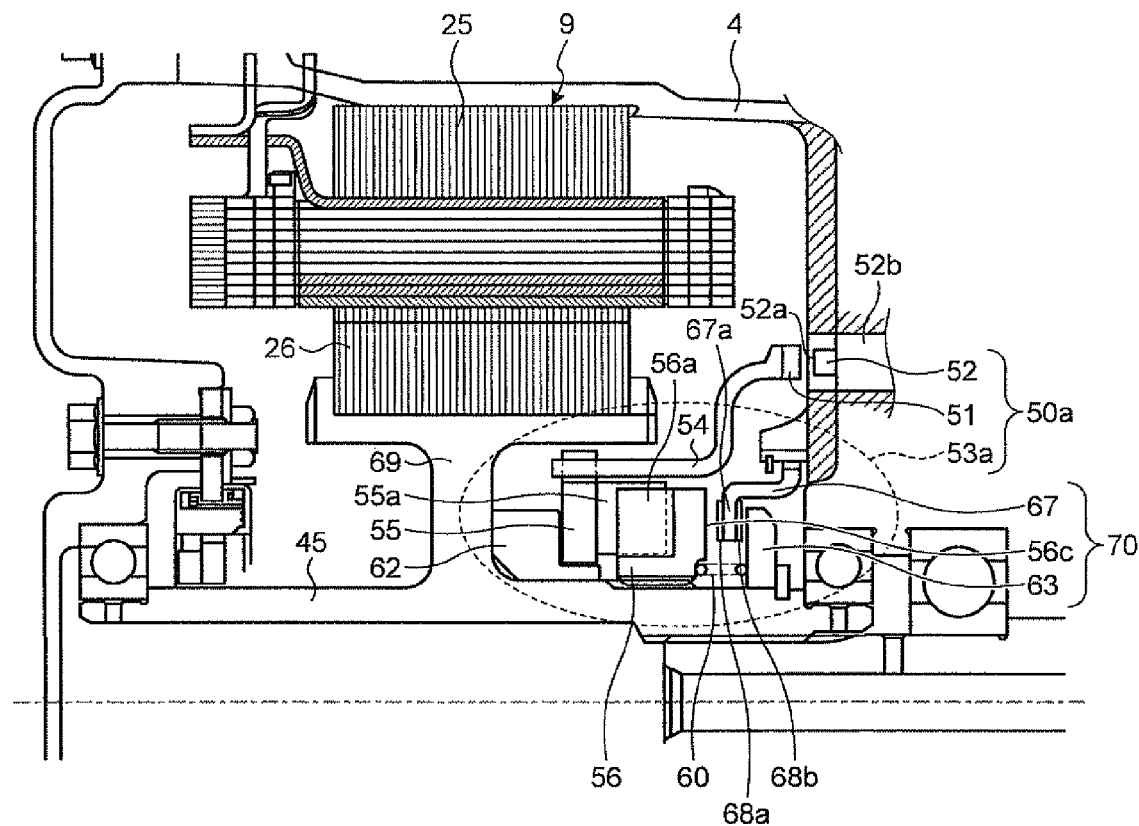
FIG. 8 is a view illustrating a schematic configuration in the vicinity of an MG shaft including a parking device according to a second embodiment.
Figure 9:
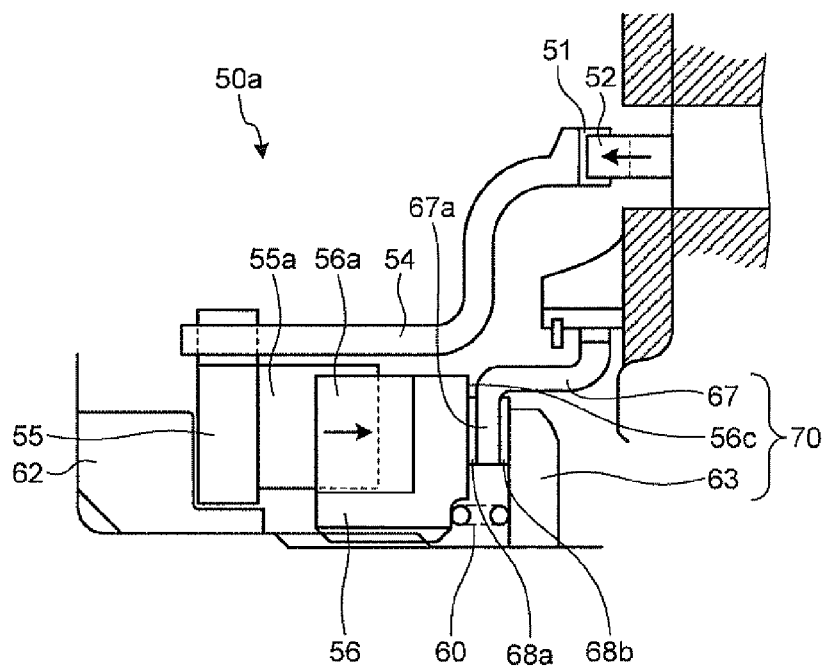
FIG. 9 is a view illustrating the positional relation of respective sections of the parking device according to the second embodiment when the parking device operates.

Next, a second embodiment of the present invention will be explained referring to FIGS. 8, 9. FIG. 8 is a view illustrating a schematic configuration in the vicinity of an MG shaft 45 including a parking device 50a according to a second embodiment, and FIG. 9 is a view illustrating the positional relation of respective sections of the parking device 50a when the parking device 50a operates. The parking device 50a according to the embodiment is different from the parking device 50 according to the first embodiment in that the parking device 50a applies a friction type brake 70 in place of the dog type brake 59 as an engaging section for causing a parking gear 51 to be engaged with the MG shaft 45 and a transaxle case 4 for accommodating the parking device 50a by the movement of a driven cam 56.

As illustrated in FIG. 8, the friction type brake 70 is an element of a parking mechanism 53a and is configured including a friction body 67, a stopper flange 63, and an end surface 56c of a driven cam 56.

As illustrated in FIG. 8, the friction body 67 is coupled with and fixed to a transaxle case 4, an extreme end 67a of the friction body 67 forms an annular shape having both surfaces confronting with the stopper flange 63 and the end surface 56c of the driven cam 56, respectively. Both the surfaces of the extreme end 67a of the friction body 67 are fixedly disposed with annular friction members 68a, 68b, respectively. The surface of the extreme end 67a of the friction body 67 to which the friction member 68a is fixedly disposed confronts with the end surface 56c of the driven cam 56, and the surface to which the friction member 68b is fixedly disposed confronts with the stopper flange 63.

The driven cam 56 has the end surface 56c on a side opposite to the cam surface 56a in an axial direction (right side, in FIG. 8). Then, the extreme end 67a of the friction body 67 is disposed between the end surface 56c of the driven cam 56 and the stopper flange 63.

When the parking device 50a operates, as illustrated in FIG. 9, the driven cam 56 receives a reaction force from the cam surface 55a of the drive cam 55 by the relative rotation generated between the drive cam 55 and the driven cam 56, and the driven cam 56 moves in a direction where it is away from the drive cam 55 (in the figure, a right direction) using the reaction force as a thrust force in the axial direction.

The end surface 56c of the driven cam 56 approaches to the friction body 67 by the movement the driven cam 56 and further a return spring 60 disposed between the driven cam 56 and the stopper flange 63 is contracted. Then, when the end surface 56c of the driven cam 56 is abutted to the friction member 68a of the friction body 67, the friction member 68b of the friction body 67 approaches to the stopper flange 63 due to the pressure force of the driven cam 56 and is abutted thereto soon. As the result, the friction body 67 is clamped from both sides by the end surface 56c of the driven cam 56 and the stopper flange 63, and the driven cam 56, the friction body 67, and the stopper flange 63 are coupled and engaged with each other integrally by the friction force between the end surface 56a of the driven cam 56 and the friction member 68a and the friction force between the stopper flange 63 and the friction member 68b.

With the configuration, when the parking gear 51 is locked by the pilot clutch 52, that is, when the parking device 50a operates, the driven cam 56 moves in the axial direction of the MG shaft 45, and the friction type brake 70 is operated by the movement of the driven cam 56, thereby the parking gear 51 is engaged with the MG shaft 45 and the transaxle case 4. At the time, since the parking gear 51 and the transaxle case 4 are fixed, the rotation of the MG shaft 45 engaged therewith is regulated. Although a reaction force is generated thereby, the reaction force is transmitted from the MG shaft 45 while being dispersed to both the parking gear 51 and the transaxle case 4. Accordingly, when the parking device 50a is operated, the reaction force transmitted from the MG shaft 45 to the parking gear 51 and the pilot clutch 52 can be reduced with a result that a shock load at the time of operation can be reduced and thus the parking device 50a can be reduced in size. Further, since the shock load received by the parking gear 51 and the pilot clutch 52 can be suppressed, durability can be improved.

Further, since it is not necessary to take the offset of phases between the elements when the friction type brake 70 operates into consideration by applying the friction type brake 70 as described above, a waiting mechanism and the like need not be provided, thereby a structure can be simplified.

Figure 10:
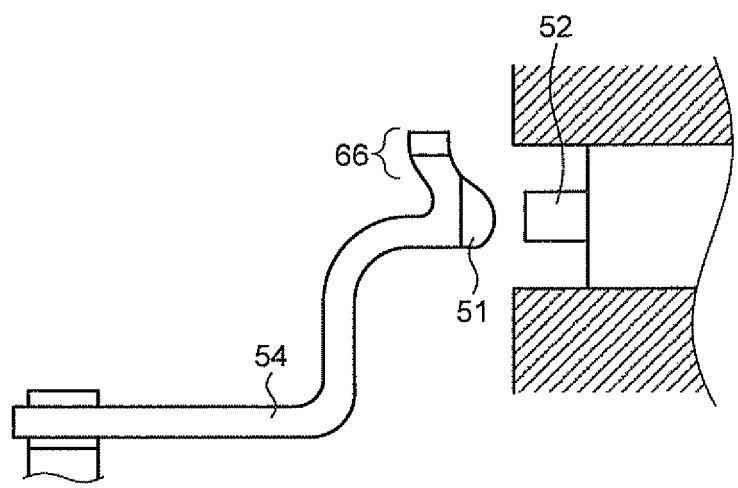
FIG. 10 is a view illustrating a modification of the shape of a tube of a parking device.

Although the present invention has been explained illustrating the preferable embodiments, the present invention is by no means limited by these embodiments. The shape of the tube 54 may be other than the embodiments, and as illustrated in, for example, FIG. 10, the tube 54 may be further extended to the stator 25 side of the second motor generator 9 and plural projections 66 may be disposed to outside of the tube 54 in the radial direction. The projections 66 may be disposed, for example, at the same intervals along the peripheral direction of the outside edge end of the tube 54 and may formed in a radial shape. With the configuration, since oil entered in the tube 54 can be blown off from the projections 66 making use of a centrifugal force and can be carried up to the inner diameter or the outer diameter of a coil end, the oil of the second motor generator 9 can be cooled. Further, a travel distance can be increased and a high load travel capability can be improved by the second motor generator 9 by reducing a stirring loss and improving a cooling property.

REFERENCE SIGNS LIST

1 ENGINE
4 TRANSAXLE CASE
5 INPUT SHAFT
9 SECOND MOTOR GENERATOR (ROTATING ELECTRIC MACHINE)
25 STATOR
26 ROTOR
43 FRONT DRIVE SHAFT (DRIVE SHAFT)
45 MG SHAFT (ROTATING ELECTRIC MACHINE SHAFT)
50, 50a PARKING DEVICE
51 PARKING GEAR
52 PILOT CLUTCH (LOCKING SECTION)
54 TUBE (COUPLING MEMBER)
55 DRIVE CAM
56 DRIVEN CAM
59 DOG TYPE BRAKE (ENGAGING SECTION)
60 RETURN SPRING (URGING MEMBER)
61 CONED DISC SPRING (WAITING MECHANISM IN AXIAL DIRECTION)
64 SHEET SPRING (WAITING MECHANISM IN PERIPHERAL DIRECTION)
65 ELASTIC MEMBER
70 FRICTION TYPE BRAKE (ENGAGING SECTION)

The invention claimed is:

1. A parking device for a hybrid vehicle configured to include an input shaft that transmits a drive force of an engine and a rotating electric machine shaft that transmits a drive force of a rotating electric machine separately and to transmit the drive force from the input shaft or the rotating electric machine shaft to a drive shaft, the parking device comprising:
    a parking gear;
    a locking section that locks the parking gear at the time of operation;
    a drive cam coupled with the parking gear and disposed around the rotating electric machine shaft;
    a driven cam disposed around the rotating electric machine shaft so as to be able to rotate integrally with the rotating electric machine shaft and capable of moving in an axial direction of the rotating electric machine shaft by a relative rotation generated between the driven cam and the drive cam when the parking gear is locked by the locking section; and
    an engaging section that engages the parking gear with the rotating electric machine shaft and a case accommodating the parking device by the movement of the driven cam.

2. The parking device according to claim 1, further comprising:
    an urging member that urges in a direction opposite to a moving direction of the driven cam by a movement of at least the driven cam.

3. The parking device according to claim 2, wherein at least parts of the drive cam, the driven cam, and the engaging section are disposed inside of a rotor of the rotating electric machine in a radial direction.

4. The parking device according to claim 3, further comprising:
    a coupling member that couples the drive cam with the parking gear and extends from inside of the rotor in the radial direction to outside of the rotor in the axial direction.

5. The parking device according to claim 4, wherein a plurality of projections are disposed outside of the coupling member in the radial direction.

6. The parking device according to any one of claim 2, wherein
    the engaging section is a dog type brake, and
    a waiting mechanism in the axial direction is disposed between the driven cam and the dog type brake.

7. The parking device according to claim 2, wherein
    the engaging section is a dog type brake, and
    an elastic member is integrally disposed between the driven cam and the dog type brake in the radial direction and the axial direction.

8. The parking device according to claim 1, wherein at least parts of the drive cam, the driven cam, and the engaging section are disposed inside of a rotor of the rotating electric machine in a radial direction.

9. The parking device according to claim 8, further comprising:
    a coupling member that couples the drive cam with the parking gear and extends from inside of the rotor in the radial direction to outside of the rotor in the axial direction.

10. The parking device according to claim 9, wherein a plurality of projections are disposed outside of the coupling member in the radial direction.

11. The parking device according to claim 10, wherein
    the engaging section is a dog type brake, and
    a waiting mechanism in the axial direction is disposed between the driven cam and the dog type brake.

12. The parking device according to claim 10, wherein
    the engaging section is a dog type brake, and
    an elastic member is integrally disposed between the driven cam and the dog type brake in the radial direction and the axial direction.

13. The parking device according to claim 9, wherein
    the engaging section is a dog type brake, and
    a waiting mechanism in the axial direction is disposed between the driven cam and the dog type brake.

14. The parking device according to claim 9, wherein
the engaging section is a dog type brake, and
an elastic member is integrally disposed between the driven cam and the dog type brake in the radial direction and the axial direction.

15. The parking device according to claim 8, wherein
the engaging section is a dog type brake, and
a waiting mechanism in the axial direction is disposed between the driven cam and the dog type brake.

16. The parking device according to claim 8, wherein
the engaging section is a dog type brake, and
an elastic member is integrally disposed between the driven cam and the dog type brake in the radial direction and the axial direction.

17. The parking device according claim 1, wherein
the engaging section is a dog type brake, and
a waiting mechanism in the axial direction is disposed between the driven cam and the dog type brake.

18. The parking device according to claim 17, wherein a waiting mechanism in the peripheral direction is disposed to the dog type brake.

19. The parking device according to claim 1, wherein
the engaging section is a dog type brake, and
an elastic member is integrally disposed between the driven cam and the dog type brake in the radial direction and the axial direction.

\* \* \* \* \*